UNITED STATES PATENT OFFICE.

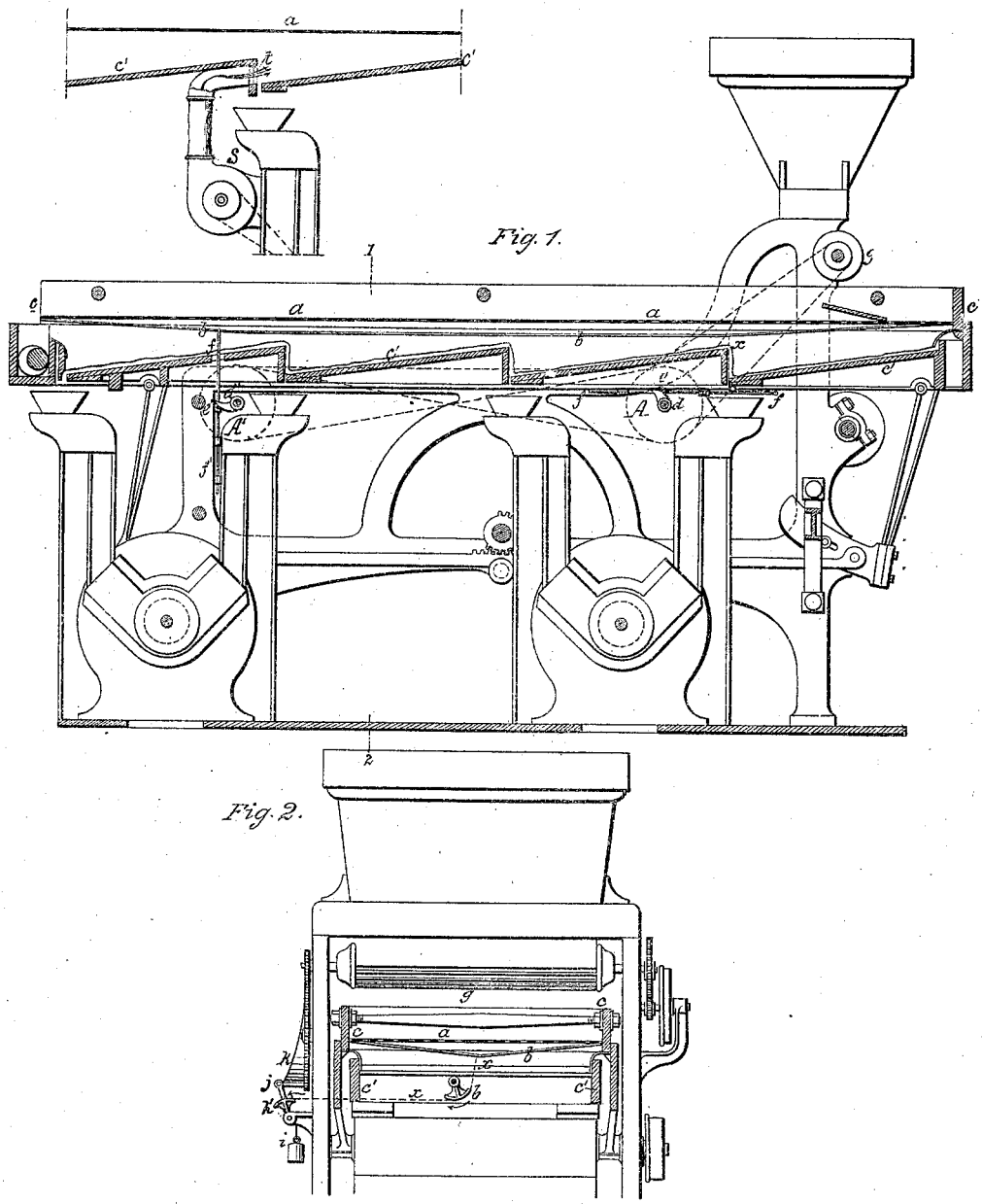

HENRI CABANES, OF BORDEAUX, FRANCE.

IMPROVEMENT IN APPARATUS FOR DRESSING FLOUR.

Specification forming part of Letters Patent No. 97,600, dated December 7, 1869.

*To all whom it may concern:*

Be it known that I, HENRI CABANES, of Bordeaux, in the Empire of France, have invented certain Improvements in Bolting Flour, &c.; and I do hereby declare the following to be a full, clear, and exact description of the same.

The object of my invention is to prevent accumulations in the sieves of bolting apparatus of the flour, or other material to be treated; and my invention consists in tapping or striking, in any suitable manner, and at greater or less intervals, the bolting cloth or sieve upon which the substance to be treated slides, in order to detach particles of farina, &c., which, by adhering to the said cloth, would seriously interfere with the operation of the apparatus.

The mechanical combinations which I propose to employ do not interfere with the ordinary arrangements of apparatus, and entail a very slight expense.

In order to enable others familiar with apparatus of this class to make and use my invention, I will now proceed to describe the method of carrying the same into effect.

Fig. 1 is a longitudinal vertical section of my improved bolting apparatus; Fig. 2, a transverse section on the line 1 2, Fig. 1, showing a modification of my improvement; and Fig. 3, a detached view of a portion of the apparatus.

Similar letters refer to similar parts throughout the several views.

Beneath the bolting-cloth $a$, which receives the material to be bolted, is a species of net-work, $b$, consisting of threads of india-rubber or equivalent elastic material, so secured to the frame $c$, which carries the bolting-cloth, that when at rest they shall be parallel with and in close proximity to the said bolting-cloth.

This netting $b$ is stretched, and then suddenly released at regular intervals by any suitable mechanism, so that by the effect of its own elasticity it will flap or strike under the bolting-cloth, and disengage the particles of farina or other material which may have collected upon and adhered to the latter so as to be an obstacle to the regular operation of the apparatus.

One of the mechanical arrangements which may be employed to effect the desired stretching and releasing of the net-work is illustrated at A, Fig. 1, it consisting of a cam, $d$, which, in rotating, strikes upon the pin $e$ of a sliding rod, $f$, and pulls the thread $x$, connected to the netting, which consequently stretches the latter. When the pin escapes from the cam, the net-work suddenly rises and strikes against the bolting-cloth.

The thread $x$ does not interfere at all with the functions of the apparatus, since it passes through the space between two of the inclined bottom pieces of the shaker-frame $c'$. The axis of the operating-cam $d$ can be furnished with a pulley to be driven by a band from the axis of the fluted roller $g$, common to apparatus of this class, or the said cam may be driven by any other organ of the apparatus.

The above arrangement can be repeated several times in the length of the frames $c$ and $c'$, as may be considered advantageous, so that the threads or net-work $b$ may be operated upon in several places at the same time.

A second arrangement, illustrated at A' in Fig. 1, differs from the preceeding only in that the netting is operated upon directly by the sliding rod, which, in this case, is marked $f'$. The rod passes upward through a slot in one of the inclined bottom pieces of the frame $c'$, and carries a small pin, $e'$, upon which a cam, $d'$, operates.

This mechanism like the preceding, can be repeated several times in the length of the apparatus.

A third arrangement for operating the elastic net-work is shown in Fig. 2, and consists in arranging beneath the lower frame $c'$ a small sector, $h$, connected by a cord or chain to another sector, $h'$, oscillating upon its axis on a support at one side of the frame of the machine. Upon this latter sector is placed a cord to which is hung a counter-weight, $i$.

The sector $h$ is connected to the netting $b$ by the thread $x$, and upon the axis of the sector $h'$ is an arm, $j$, the extremity of which is in contact with a cam, $k$, cast upon a cog-wheel, which is driven by a pinion upon the axis of the flutted roller $g$, or in any other manner.

The rotation of the cam $k$ operates the lever $j$, which moves the sectors $h'$ and $h$ in the direction of their arrows. At a certain point of its rotation the cam permits the lever to escape, the latter being moved by the counter-weight $i$, whereupon the sectors are moved in the contrary direction, and the net-work strikes underneath the bolting-cloth.

I would remark that I have described and represented these several arrangements only by way of example, to give an idea of the way in which I intend to effect the flapping or striking of the bolting-cloth to prevent the accumulation of substances thereupon.

Fig. 3 shows an arrangement which I use when treating heavy grains or other material to be bolted, which would, owing to their weight, cause the bolting-cloth to sag downward, and render the elastic threads or netting inoperative.

It consists in the employment of one, two, or more additional ventilators, $s$, fixed either upon the floor or platform, or upon the apparatus itself, and which conduct a supply of air under pressure to a point beneath the bolting-cloth, for the purpose of buoying up the latter.

The air from the ventilators is passed through a frame, $t$, of wire-gauze, or its equivalent, so that it may be equally diffused before passing into the space beneath the bolting-cloth.

I claim as my invention and desire to secure by Letters Patent—

1. The devices herein described, or any equivalents to the same, whereby an elastic net-work, or series of elastic cords, $b$, may be drawn back from a bolting-cloth, $a$, and suddenly released, so as to strike the said cloth, substantially in the manner and for the purpose herein set forth.

2. The combination of a bolting-cloth, a fan, or its equivalent, and conducting-tubes, so arranged that a current of air is passed beneath the said cloth and supports the latter, substantially as described.

In testimony whereof I have signed my name to this specification in the presence of two subscribing witnesses.

HENRI CABANES.

Witnesses:
M. CANDONNEL,
U. DE LA PAUX.